No. 887,958. PATENTED MAY 19, 1908.
W. H. NIEMEYER.
PORTABLE COTTON PICKING MACHINE.
APPLICATION FILED JULY 26, 1906.
2 SHEETS—SHEET 2.
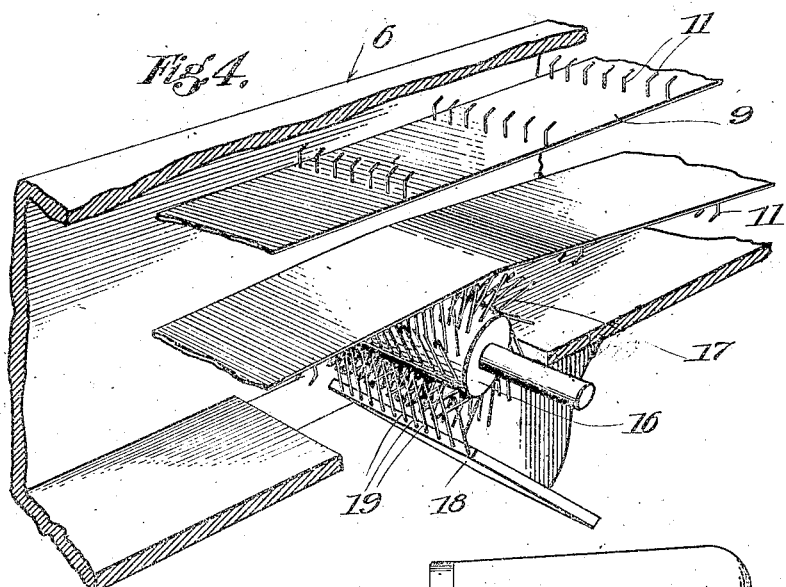
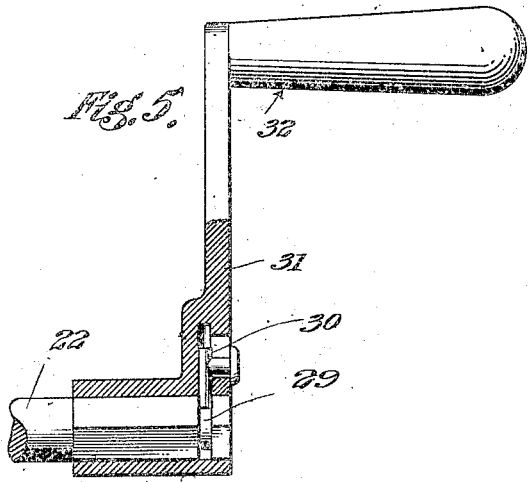

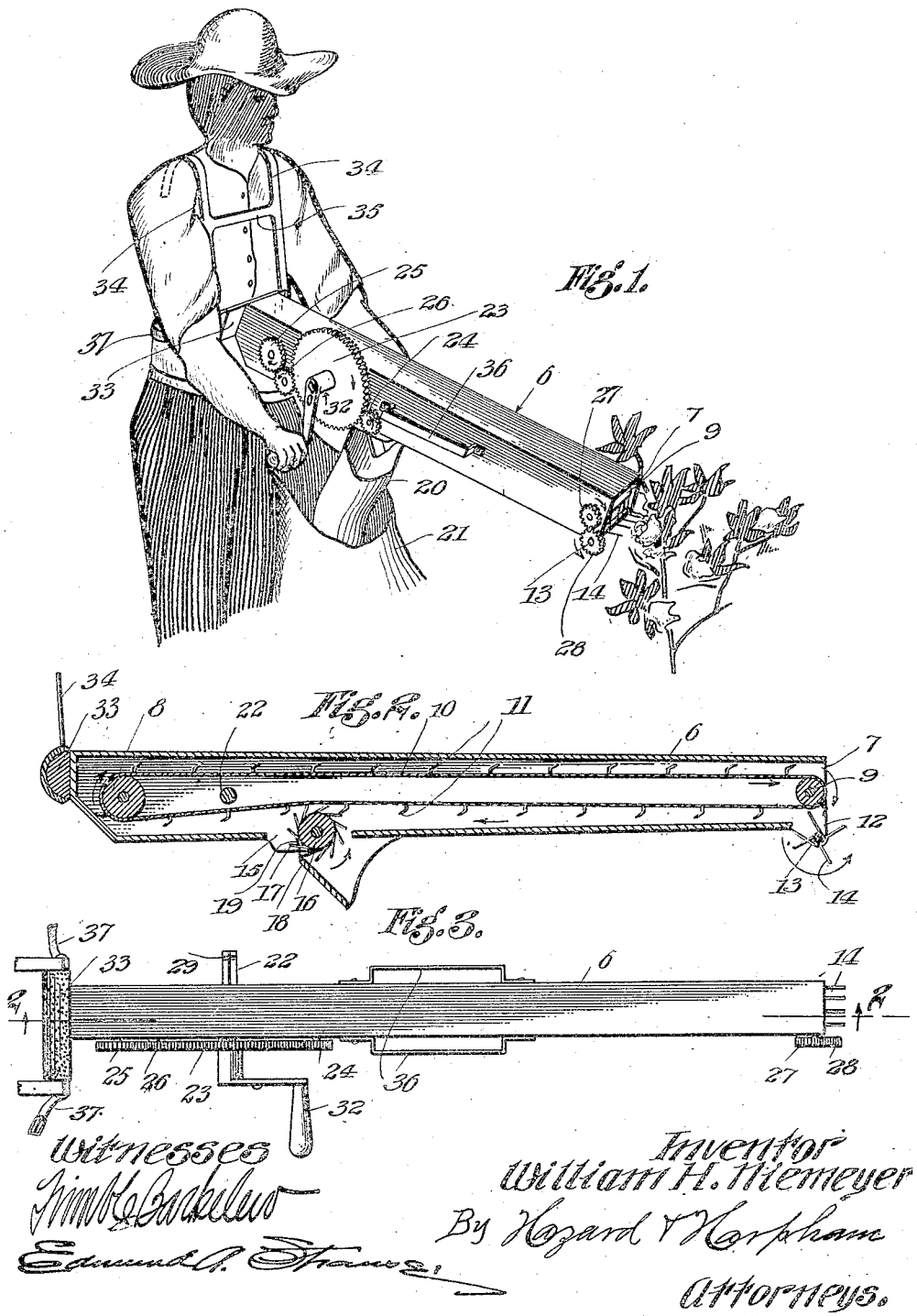

UNITED STATES PATENT OFFICE.

WILLIAM HENRY NIEMEYER, OF LOS ANGELES, CALIFORNIA.

PORTABLE COTTON-PICKING MACHINE.

No. 887,858.

Specification of Letters Patent.

Patented May 19, 1908.

Application filed July 26, 1906. Serial No. 327,970.

*To all whom it may concern:*

Be it known that I, WILLIAM HENRY NIEMEYER, a citizen of the United States, residing at Los Angeles, in the county of Los An geles and State of California, have invented new and useful Improvements in Portable Cotton-Picking Machines, of which the following is a specification.

My invention relates to a manually oper ated portable cotton picking machine that operates on the conveyer principle and an object thereof is to provide a machine which enables an operator to pick much larger quantities of cotton in a given time than can be picked by hand.

Another object is to provide a machine which will enable an operator to assume an erect position while operating the machine.

A further object is to provide a machine that can be carried by an operator without fatigue, that is durable in construction and efficient in operation.

I accomplish these objects by means of the device described herein and illustrated in the accompanying drawings in which:—

Figure 1.—is a perspective view of my machine secured to an operator. Fig. 2.—is a longitudinal section of the machine taken on line 2—2 of Fig. 3. Fig. 3.—is a plan of my machine. Fig. 4.—is an enlarged fragmentary perspective view of a portion of the conveyer, detaching cylinder and comb. Fig. 5.—is an enlarged detailed section of the operating handle.

The machine consists of a frame 6, preferably constructed of wood, having an opening 7 at the outer end. Mounted on the inside of the frame, and at either end thereof are conveyer drums 8 and 9, on which is mount ed an endless conveyer belt 10 preferably constructed of canvas. To the face of this belt are secured a plurality of picks 11, the outer ends of which are inclined in the direction in which the belt travels and are prefer ably secured thereto in transverse rows equal distances apart.

Mounted in bearings 12 on the outer end of the frame and below the outer end of the conveyer drum 9 and slightly in advance thereof is a shaft 13 to the periphery of which is secured a plurality of fingers 14 arranged in transverse rows and inclined in the direction in which the shaft 13 rotates. The purpose of this mechanism is to guide or bring into position the bolls of cotton on the plant so as to enable the picks 11 on the conveyer belt to extract the cotton therefrom.

Mounted in bearings in the discharge opening 15 and below the conveyer belt is a detaching drum 16, to the periphery of which is secured a plurality of fingers 17 inclined in the direction opposite to the rotation of said drum. The purpose of this detaching drum is to remove the cotton from the picks 11 of the conveyer belt. A comb 18 has a series of teeth 19 which project between the fingers on the detaching drum. This comb removes the material from the detaching drum and permits it to fall through the discharge tube 20 which is secured to the discharge opening 15, to the bag 21 attached to the operator.

Transversely mounted in the frame near the inner end thereof and between the upper and lower part of the conveyer belt is operating shaft 22 which projects on either side of the frame. Mounted on one side of this operating shaft is driving gear 23 which meshes with pinion 24 which pinion is secured to one end of the shaft of the detaching drum 16. Mounted on one end of the shaft of the conveyer drum 8 is pinion 25 which meshes with the driving gear through an idler pinion 26 which is secured to the side of the frame. The conveyer drum 9 has a pinion 27 secured to one end of its shaft which meshes with a pinion 28 secured to one end of the positioning shaft 13 by which means the shaft is driven.

The operating shaft 22 is square on each end and is provided with annular grooves 29 which are adapted to receive a securing pin 30 which is slidingly mounted in arm 31 of the removable operating handle 32.

On the inner end of the frame is a cushion 33 which extends transversely thereof and is adapted to bear against the operator. Pivotally secured to either side of the cushion are metallic shoulder attaching hooks 34 which are joined together by transverse bar 35. Secured to the sides of the frame are directing handles 36, one of which may be grasped by the operator while the machine is being operated. On either side of the cushion 33 are body straps 37, which, when secured to an operator serve to hold the machine firmly in place while it is being operated.

The operation of the machine is as follows: Before the operator enters a cotton field the machine is secured to him by means of the attaching hooks 34 and the body straps 37. The operator then grasps one of the directing handles 36 and the operating handle secured to the driving gear, directing the end of the machine so that the fingers on the positioning shaft will contact with a ripe cotton boll so as to bring it into a position so that the picks 11 on the conveyer belt can gather the cotton from the boll. The direction of rotation of the conveyer belt being outwardly carries the cotton gathered from the boll rearwardly to the detaching cylinder which rotates in the same direction in which the lower portion of the conveyer belt moves. The fingers of this detaching drum being inclined in the opposite direction in which the drum is rotating, enables the fingers to readily detach the cotton from the inclined picks 11 on the conveyer belt. After cotton has been detached from the conveyer belt the teeth on the comb 18 permits the cotton to fall from the detaching drum through the discharge tube 20 to the bag 21 carried by the operator.

It will be noticed that by means of the gearing by which the machine is operated I can regulate the speed of the several mechanisms; for instance, a detaching drum rotating twice as fast as a conveyer belt will quickly and easily remove the cotton from the belt and a conveyer belt moving twice as quickly as a positioning means will remove from the positioning means any cotton which may adhere thereto.

It will thus be seen from the foregoing description that I have produced a machine which is durable in construction, simple and effective in operation and which is capable of gathering much larger quantities of cotton in a given time than could be gathered otherwise.

Having described my invention what I claim as new and desire to secure by Letters Patent is:—

1. In a machine of the character herein described, a frame; an endless belt mounted on inner and outer drums revolubly mounted in said frame; a plurality of picks secured to the outer face of said belt; a positioning shaft revolubly mounted in the outer end of said frame; a plurality of fingers secured to said shaft; a detaching drum revolubly mounted in said frame adjacent the conveyer; a plurality of fingers secured to said drum; detaching means secured to said frame; an operating shaft transversely mounted in said frame and extending beyond the sides thereof; a driving gear mounted on said shaft; a pinion in mesh with said driving gear secured to the detaching drum; an idler pinion mounted on the outer side of said frame in mesh with the driving gear; a pinion secured to the shaft of the inner drum of the conveyer in mesh with the idler pinion; a pinion secured to the shaft of the outer drum of the conveyer; a pinion secured to the outer end of the positioning shaft, said pinion being in mesh with said last named pinion; and means to operate the driving gear.

2. In a machine of the character herein described, a rectangular frame; an endless belt mounted on inner and outer drums revolubly mounted in said frame; a plurality of picks secured to the outer face of said belt; a positioning shaft revolubly mounted in the outer end of said frame having a plurality of fingers inclined in the direction of rotation of said shaft; a detaching drum revolubly mounted in said frame adjacent the conveyer, said drum having a plurality of fingers inclined in the direction opposite the rotation of said drum; a detaching comb mounted in the frame, the teeth of said comb projecting between the fingers secured to the periphery of said detaching drum; supporting means secured to said frame; an operating shaft transversely mounted in said frame and extending beyond the sides thereof; a driving gear mounted on said shaft; a pinion in mesh with said driving gear secured to the detaching drum; an idler pinion mounted on the outer side of said frame in mesh with the driving gear; a pinion secured to the shaft of the inner drum of the conveyer in mesh with the idler pinion; a pinion secured to the shaft of the outer drum of the conveyer; a pinion in mesh with said last named pinion secured to the outer end of the positioning shaft; and means to operate the driving gear.

In witness that I claim the foregoing I have hereunto subscribed my name this 12th day of July, 1906.

WILLIAM HENRY NIEMEYER.

Witnesses:
EDMUND A. STRAUSE,
G. E. HARPHAM.